B. R. PILCHER.
RESILIENT WHEEL.
APPLICATION FILED AUG. 29, 1911.
1,112,931.
Patented Oct. 6, 1914.
3 SHEETS—SHEET 3.
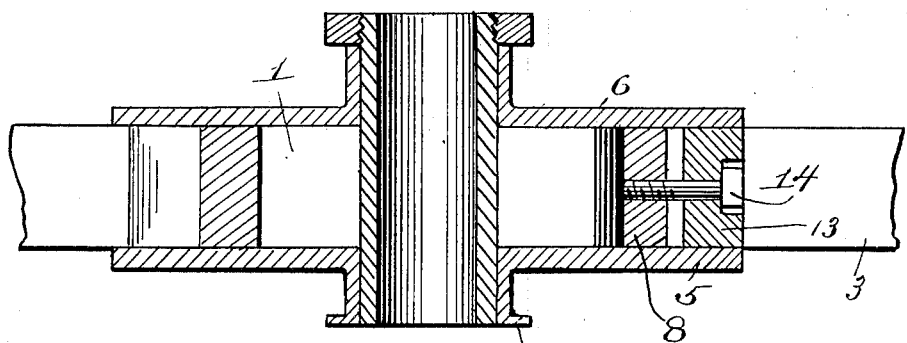
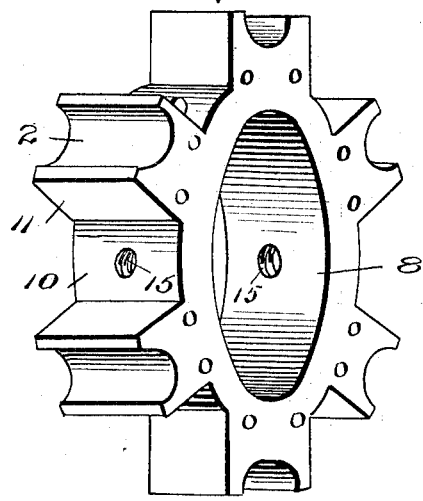
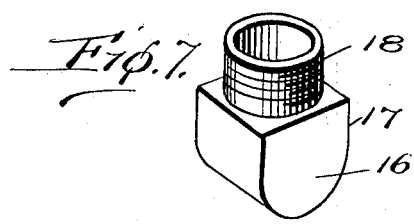
Witnesses
J. M. Fowler Jr.
A. S. Kitchin.
Inventor
Benjamin R. Pilcher
By Mason Fenwick Lawrence
his Attorneys

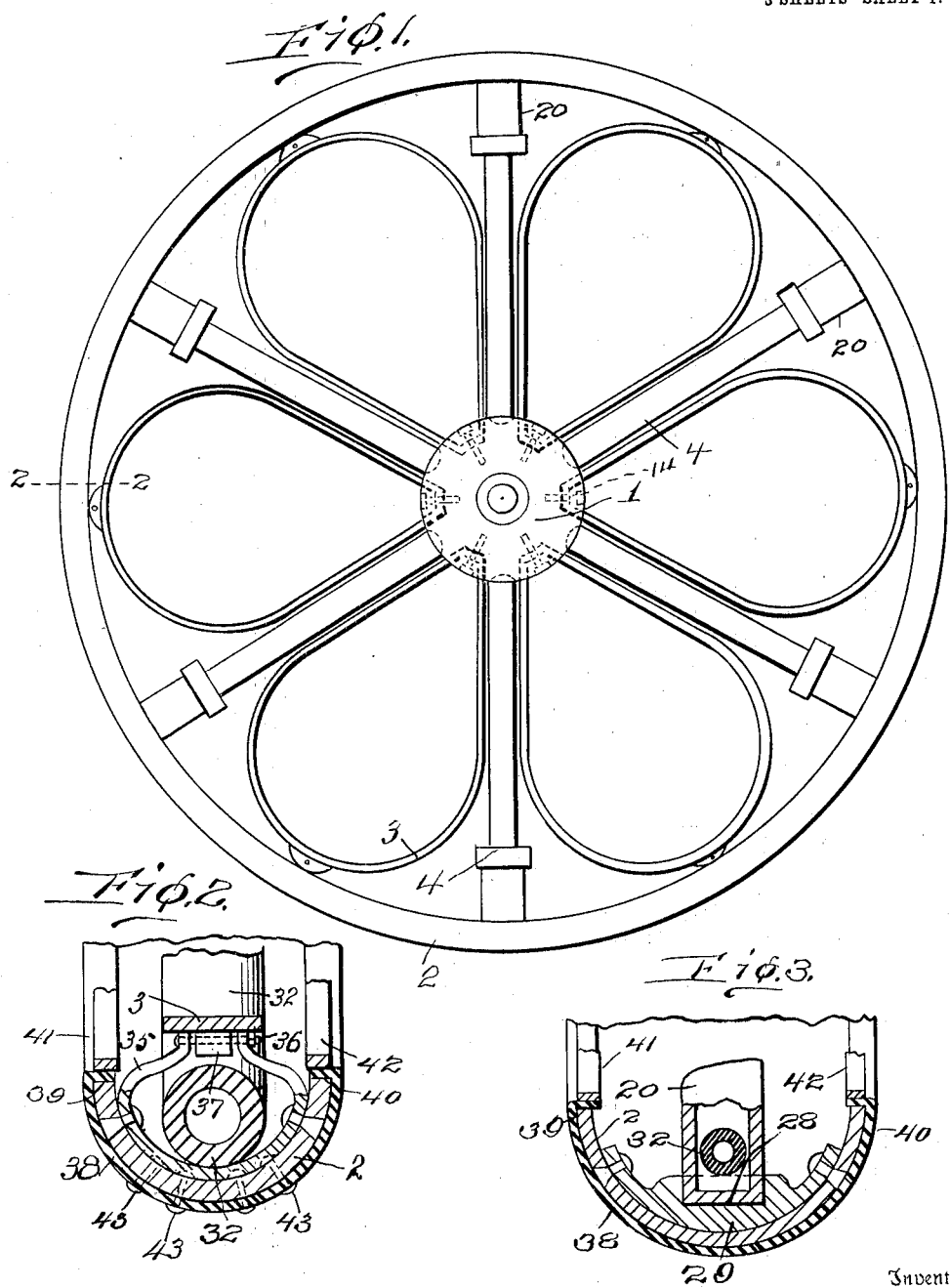

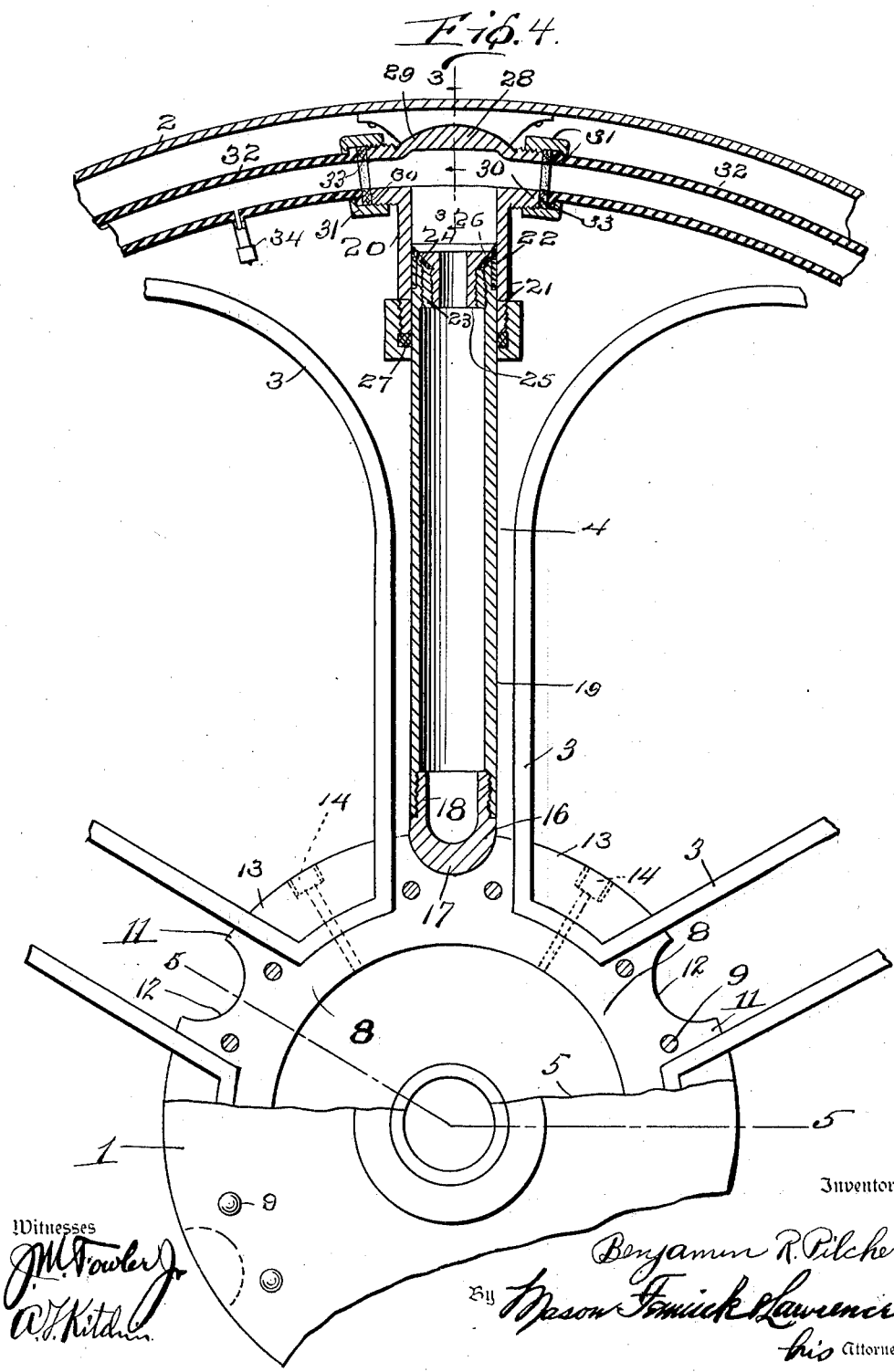

UNITED STATES PATENT OFFICE.

BENJAMIN R. PILCHER, OF DOTHAN, ALABAMA.

RESILIENT WHEEL.

1,112,931. Specification of Letters Patent. Patented Oct. 6, 1914.

Application filed August 29, 1911. Serial No. 646,713.

*To all whom it may concern:*

Be it known that I, BENJAMIN R. PILCHER, a citizen of the United States, residing at Dothan, in the county of Houston and State of Alabama, have invented certain new and useful Improvements in Resilient Wheels; and I do hereby declare the following to be a full, clear, and exact description of the invention, such as will enable others skilled in the art to which it appertains to make and use the same.

This invention relates to improvements in resilient wheels, and has for an object the arrangement of improved means for utilizing the resiliency of springy material, and also if desired utilizing the resilient quality of confined air.

The object in view is the provision of improved means for utilizing the resilient effect of bowed spring spokes and the resilient effect of confined air acting on movable pistons and cylinders.

A further object of the invention is the arrangement in a wheel, of a hub structure formed with a spider arranged to receive a plurality of pivotally mounted pistons and spring spokes, the spring spokes and pistons co-acting with a rim for completing the wheel and for resiliently taking up any shocks.

A still further object of the invention is the arrangement in a resilient wheel, of an improved hub, a plurality of spokes connected to the hub and to the rim, and a plurality of air cushion means for assisting the spokes, the same being connected to the rim and hub.

With these and other objects in view the invention comprises certain novel constructions, combinations, and arrangement of parts as will be hereinafter more fully described and claimed.

In the accompanying drawings: Figure 1 is a side elevation of an embodiment of the invention. Fig. 2 is an enlarged view on line 2—2 of Fig. 1. Fig. 3 is a section approximately on line 3—3 of Fig. 4. Fig. 4 is an enlarged fragmentary view partially in section showing a pneumatic spoke and associated parts, and spring spokes co-acting therewith. Fig. 5 is a section through Fig. 4 on line 5—5. Fig. 6 is a detail fragmentary view of a spider embodying certain features of the invention. Fig. 7 is a detail perspective view of a socket member.

In constructing a wheel embodying the invention an improved hub is provided formed with a bearing center member, side plates, and a specially designed spider which is rigidly clamped to the side plates. Connected to or bearing against the spider are a plurality of spring spokes, and a plurality of pneumatic spokes which assist each other in properly supporting a rim so as to resiliently take up shocks.

In the drawings 1 indicates a hub, 2 the rim, and 3 and 4 resilient and pneumatic spokes respectively. The hub 1 is formed with side plates 5 and 6, side plate 5 being formed with a flange 7 to which may be secured a sprocket gear wheel or other device for transmitting power to the wheel. Arranged between the side plates 5 and 6 is a spider 8 which is rigidly held in place by suitable bolts or rivets 9. The spider 8 is formed with a plurality of sockets 10 and a plurality of projections 11 formed with journal portions 12. The spokes 3 are formed so as to fit into sockets 10 and be clamped therein by blocks 13 held in place by binding screws 14 which pass through the blocks and enter threaded apertures 15 in the spider 8. Preferably the heads of the binding screws 14 are counter-sunk so as not to appear above the periphery of the hub. In each of the journal portions 12 is a bearing socket member 16 formed with a bearing surface 17 and a threaded extension 18. Bearing portion 17 is adapted to fit into the bearing portion 12 and permit the bearing socket 16 to freely oscillate.

Connected with extension 18 is a hollow piston rod 19 which extends outward radially from the hub 1 and enters cylinder 20. It will be noted that there is one piston rod 19 and one cylinder 20 for each of the spokes 4, and therefore the description of one, which is clearly shown in Fig. 4, will be sufficient for all of the spokes 4. Each of the piston rods 19 is formed with a reduced portion 21 for accommodating a washer or band 22, preferably of leather. This band is to assist in affording a tight joint between the rod 19 and cylinder 20, and to assist in preventing the contacting metals from wearing. Threaded into the end of rod 19 is a sleeve 23 upon which is positioned a washer 24. Washer 24 is held in place by threaded sleeve 25 which sleeve is formed with a flange member 26 adapted to bear against washer 24 for firmly clamping the same against sleeve 23. The washer 24 and the band 22 form contacting means for the rod 19, so that no air may escape during the movement of the rod back and forth. A packing box 27 is also provided for thoroughly packing the connection between the piston rod 19 and the cylinder 20. The cylinder 20 is formed with a rounded bearing portion 28 which fits into a bearing member 29, which bearing member is rigidly secured to rim 2. Cylinder 20 is also formed with hollow threaded extensions 30 which are adapted to receive clamping nuts 31 and hold in place connecting tubes 32. The tubes 32 connect the respective cylinders 20 and are preferably provided with packing 33, which packing prevents the escape of air through the juncture of extensions 30 and tubes 32. In constructing the cylinder 20 the same is preferably made of considerably larger diameter than the tubes 32 in order to contain a larger volume of air for giving a resilient effect when piston rod 19 is quickly forced down. It will be noted that the air in piston rod 19 and cylinder 20 may freely escape through tubes 32 from one pneumatic spoke to the other, but by reason of the difference in size of the tubes 32 and piston rod 19 a yielding resilient effect is produced. After the wheel has been assembled air is forced into one of the tubes 32 through a suitable air valve 34 until the air in the tubes 32 and associated parts has been compressed to the desired extent. If at any time the air pressure in the tubes and associated parts should fall below a predetermined pressure additional pressure may be supplied by the use of an air pump in the usual manner.

In constructing a wheel embodying the invention any desired number of pneumatic spokes 4 may be used, but preferably a number which is a multiple of 2 in order that the spokes 4 may be best assisted by the resilient metallic spokes 3. The spokes 3 are formed of any desired kind of metal, and may be formed continuous or in parts as preferable. These spokes are made substantially elliptical, and are secured at the point of their major axes to the head and rim respectively. In securing the spokes 3 to rim 2 a bracket 35 (Fig. 2) is provided which is rigidly secured by rivets or the like to the rim 2. Extending through the ends of bracket 35 is a bolt 36 which also extends through a lug or projection 37 extending from the respective spokes 3. Bracket 35 is provided in order to properly secure spokes 3 in position, and also to accommodate tubes 32. It will, of course, be evident that lug 37 could be dispensed with and an aperture provided in the respective spokes 3 through which a securing bolt or pin could be passed, and from thence into bracket 35.

The rim 2 is preferably made of metal, and has secured thereto a tire or covering 38 formed of any desired kind of yielding or resilient material, as for instance, canvas and rubber. The tire or covering 38 is bent around at points 39 and 40 over the edges of tire 2, and is clamped in place by suitable rings or hoops 41 and 42. If desired any desired number of rivets 43 could be provided for holding the tire in place.

What I claim is:

1. In a resilient wheel, a sectional air tube, a rim extending about the outer portion of the air tube, a hub, radial tubular members connected with the hub, cylinders having laterally extending port members, the cylinders constituting couplings and each having a main bore and a bore extending transversely thereof for connecting the sections of the tube substantially in line with the transverse bore, the radial members reciprocating in the cylinders, and resilient spokes between each pair of radial tubular members, concave socket members secured to the rim, the ends of the cylinders being convex and entering said socket members.

2. In a resilient wheel, a sectional air tube, a rim extending about the outer portion of the air tube, a hub, radial tubular members connected with the hub, cylinders having laterally extending port members for connection with sections of the tube, permitting the air to pass between the cylinders, bearing members carried by the rim and receiving the end portions of the cylinders, such cylinders receiving the ends of the radial tubular members, concentric sleeves within the ends of the radial members, one of the sleeves being flanged, and a packing material between the flanged portions and the ends of the radial members.

In testimony whereof I affix my signature in presence of two witnesses.

BENJAMIN R. PILCHER.

Witnesses:
 ROBT. T. LANG,
 A. L. KITCHIN.

Copies of this patent may be obtained for five cents each, by addressing the "Commissioner of Patents, Washington, D. C."